United States Patent
Yoshioka et al.

(10) Patent No.: US 11,759,740 B2
(45) Date of Patent: *Sep. 19, 2023

(54) HONEYCOMB FILTER

(71) Applicant: NGK Insulators, Ltd., Nagoya (JP)

(72) Inventors: Fumihiko Yoshioka, Nagoya (JP); Yuji Sasaki, Nagoya (JP); Kimiko Kishine, Nagoya (JP); Sachiko Ishida, Nagoya (JP); Kyohei Kato, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,255

(22) Filed: Jan. 18, 2021

(65) Prior Publication Data

US 2021/0268423 A1 Sep. 2, 2021

(30) Foreign Application Priority Data

Mar. 2, 2020 (JP) ................................ 2020-034881

(51) Int. Cl.
*B01J 21/04* (2006.01)
*B01J 35/04* (2006.01)
(Continued)

(52) U.S. Cl.
CPC ..... *B01D 46/2429* (2013.01); *B01D 39/2068* (2013.01); *B01D 46/2476* (2021.08);
(Continued)

(58) Field of Classification Search
CPC ........ B01J 21/04; B01J 35/04; B01J 35/1052; B01J 46/2429; B01J 39/2068; B01J 53/9413; F01N 3/0222; F01N 3/2803
See application file for complete search history.

(56) References Cited

U.S. PATENT DOCUMENTS

| 7,504,359 B2 * | 3/2009 | Ogyu ................... F01N 3/2828 502/527.19 |
| 7,923,093 B2 * | 4/2011 | Melscoet-Chauvel ...................... B01D 46/24493 428/116 |

(Continued)

FOREIGN PATENT DOCUMENTS

| CN | 110314711 A1 | 10/2019 |
| EP | 1 842 578 A2 | 10/2007 |

(Continued)

OTHER PUBLICATIONS

German Office Action (Application No. 10 2021 201 560.3) dated May 27, 2021 (with English translation).

(Continued)

*Primary Examiner* — Cam N. Nguyen
(74) *Attorney, Agent, or Firm* — BURR PATENT LAW, PLLC

(57) ABSTRACT

A honeycomb filter includes a pillar-shaped honeycomb structure body having a porous partition wall disposed to surround a plurality of cells and a plugging portion, wherein the partition wall is composed of a material containing cordierite as a main component thereof, porosity of the partition wall measured by a mercury press-in method is 60 to 68%, an average pore diameter of the partition wall measured by a mercury press-in method is 8 to 12 and in a pore diameter distribution which indicates a cumulative pore volume of the partition wall measured by a mercury press-in method, with a pore diameter (μm) on an abscissa axis and a log differential pore volume (cm³/g) on an ordinate axis, a first peak that includes a maximum value of the log differential pore volume has a pore diameter value of 10 μm or less, the pore diameter value corresponding to a ⅓ value width of the maximum value.

4 Claims, 4 Drawing Sheets

(51) Int. Cl.
*B01J 35/10* (2006.01)
*B01D 46/24* (2006.01)
*B01D 39/20* (2006.01)
*B01D 53/94* (2006.01)
*F01N 3/022* (2006.01)
*F01N 3/28* (2006.01)

(52) U.S. Cl.
CPC . *B01D 46/24491* (2021.08); *B01D 46/24492* (2021.08); *B01D 53/9413* (2013.01); *B01J 21/04* (2013.01); *B01J 35/04* (2013.01); *B01J 35/1076* (2013.01); *F01N 3/0222* (2013.01); *F01N 3/2803* (2013.01); *B01D 2255/2092* (2013.01); *B01D 2255/9155* (2013.01); *B01D 2279/30* (2013.01); *F01N 2330/02* (2013.01); *F01N 2330/30* (2013.01); *F01N 2370/02* (2013.01)

(56) References Cited

U.S. PATENT DOCUMENTS

| | | | | |
|---|---|---|---|---|
| 8,192,517 B2 * | 6/2012 | Kunieda | ............... | F01N 3/2828 60/311 |
| 8,444,739 B2 * | 5/2013 | Mizuno | ............... | B01D 46/2451 422/177 |
| 8,500,840 B2 * | 8/2013 | Okazaki | ............... | C04B 38/0006 422/177 |
| 8,512,433 B2 * | 8/2013 | Beall | ............... | F01N 3/0222 422/170 |
| 8,636,821 B2 * | 1/2014 | Okazaki | ........... | B01D 46/24492 55/524 |
| 8,657,914 B2 * | 2/2014 | Tanaka | ............... | B01D 46/2482 422/177 |
| 8,663,356 B2 * | 3/2014 | Goto | ............... | B01D 46/24492 55/524 |
| 8,691,361 B2 * | 4/2014 | Okazaki | ........... | B01D 46/24492 428/116 |
| 8,734,558 B2 * | 5/2014 | Miyairi | ............... | B01D 46/2474 422/182 |
| 8,764,872 B2 * | 7/2014 | Isoda | ............... | C04B 41/85 422/182 |
| 8,802,017 B2 * | 8/2014 | Mizutani | ........... | B01D 46/2478 422/177 |
| 8,821,609 B2 * | 9/2014 | Okazaki | ............... | B01D 46/2425 422/171 |
| 9,061,942 B2 * | 6/2015 | Miyairi | ........... | B01D 46/24492 |
| 9,188,044 B2 * | 11/2015 | Aoki | ............... | B01J 35/0006 |
| 9,303,542 B2 * | 4/2016 | Aoki | ............... | B01J 35/04 |
| 9,303,543 B2 * | 4/2016 | Aoki | ............... | B01J 35/0006 |
| 9,333,486 B2 * | 5/2016 | Ono | ............... | B01D 46/2418 |
| 9,347,357 B2 * | 5/2016 | Sugimoto | ........... | B01D 46/2484 |
| 9,487,448 B2 * | 11/2016 | Miyairi | ............... | C04B 38/0006 |
| 9,550,175 B2 * | 1/2017 | Shibata | ............... | B01D 46/2486 |
| 9,649,587 B2 * | 5/2017 | Okazaki | ............... | C04B 35/195 |
| 9,650,928 B2 * | 5/2017 | Shibata | ............... | B01D 46/2484 |
| 9,650,929 B2 * | 5/2017 | Shibata | ............... | B01D 46/2494 |
| 9,707,516 B2 * | 7/2017 | Goto | ............... | B01D 46/2478 |
| 9,708,958 B2 * | 7/2017 | Okazaki | ............... | C04B 35/195 |
| 9,724,634 B2 * | 8/2017 | Kasuga | ............... | B01D 46/2429 |
| 9,822,681 B2 * | 11/2017 | Kikuchi | ............... | B01D 53/94 |
| 9,839,869 B2 * | 12/2017 | Kasuga | ............... | B01D 46/2429 |
| 9,945,279 B2 * | 4/2018 | Izumi | ............... | F01N 3/035 |
| 9,968,879 B2 * | 5/2018 | Okazaki | ............... | B01D 46/2429 |
| 10,072,543 B2 * | 9/2018 | Okazaki | ............... | C04B 35/195 |
| 10,207,223 B2 * | 2/2019 | Makino | ............... | B01J 21/063 |
| 10,286,358 B2 * | 5/2019 | Goto | ............... | F01N 3/0222 |
| 10,300,424 B2 * | 5/2019 | Shibata | ............... | B01D 46/247 |
| 10,335,727 B2 * | 7/2019 | Shibata | ............... | B01D 46/2486 |
| 10,350,532 B2 * | 7/2019 | Wolff | ............... | B01D 46/82 |
| 10,369,545 B2 * | 8/2019 | Yamamoto | ............ | F01N 3/2828 |
| 10,399,074 B2 * | 9/2019 | Okazaki | ............... | F01N 3/28 |
| 10,540,775 B2 * | 1/2020 | Sakai | ............... | B01D 46/2482 |
| 10,610,830 B2 * | 4/2020 | Izumi | ............... | F01N 3/2842 |
| 10,625,195 B2 * | 4/2020 | Kato | ............... | B01D 46/2429 |
| 10,653,998 B2 * | 5/2020 | Yamamoto | ............ | B01D 46/247 |
| 10,675,591 B2 * | 6/2020 | Kurimoto | ............ | B01J 37/0201 |
| 10,814,266 B2 * | 10/2020 | Kato | ............... | B01D 46/00 |
| 10,821,390 B2 * | 11/2020 | Yoshioka | ............... | B01D 46/247 |
| 10,828,630 B2 * | 11/2020 | Obata | ............... | B01J 29/061 |
| 10,830,113 B2 * | 11/2020 | Nagai | ............... | F01N 3/0222 |
| 10,940,419 B2 * | 3/2021 | Konno | ............... | B01D 46/2474 |
| 11,058,983 B2 * | 7/2021 | Yasui | ............... | B01D 46/2482 |
| 11,065,571 B2 * | 7/2021 | Yasui | ............... | B01D 46/2482 |
| 11,167,279 B2 * | 11/2021 | Kuki | ............... | B01D 46/247 |
| 11,305,270 B2 * | 4/2022 | Yamada | ............... | B01J 23/10 |
| 2003/0041574 A1 | 3/2003 | Noguchi et al. | | |
| 2007/0234694 A1 | 10/2007 | Miyairi et al. | | |
| 2008/0070776 A1 * | 3/2008 | Yamaguchi | ............... | B01J 35/04 502/100 |
| 2008/0092499 A1 | 4/2008 | Otsuka et al. | | |
| 2009/0011919 A1 | 1/2009 | Noguchi et al. | | |
| 2009/0238733 A1 * | 9/2009 | Ohno | ............... | B01D 46/2425 502/232 |
| 2009/0291839 A1 * | 11/2009 | Kunieda | ............ | B01D 46/2474 428/116 |
| 2010/0304082 A1 | 12/2010 | Merkel | | |
| 2012/0064286 A1 * | 3/2012 | Hirose | ............... | F01N 3/2828 428/116 |
| 2012/0186206 A1 * | 7/2012 | Tanaka | ............... | B01D 46/2429 55/476 |
| 2012/0244042 A1 * | 9/2012 | Mizutani | ........... | B01D 46/2429 422/180 |
| 2012/0317946 A1 * | 12/2012 | Miyairi | ............... | B01D 46/2429 55/523 |
| 2013/0059724 A1 * | 3/2013 | Hirose | ............... | B01D 46/2429 428/116 |
| 2013/0145735 A1 * | 6/2013 | Motoki | ............... | C04B 35/195 55/529 |
| 2015/0251124 A1 | 9/2015 | Okazaki | | |
| 2015/0258485 A1 * | 9/2015 | Kikuchi | ............... | C04B 38/0006 422/177 |
| 2015/0275725 A1 * | 10/2015 | Ichikawa | ............... | C04B 35/6316 428/116 |
| 2016/0271549 A1 * | 9/2016 | Kikuchi | ............... | F01N 3/035 |
| 2017/0197167 A1 * | 7/2017 | Shibata | ............... | B01D 46/2482 |
| 2017/0284246 A1 * | 10/2017 | Kimura | ............... | B32B 18/00 |
| 2018/0214810 A1 * | 8/2018 | Iida | ............... | B01D 53/944 |
| 2018/0250658 A1 * | 9/2018 | Nakao | ............... | B01J 35/04 |
| 2019/0301326 A1 | 10/2019 | Yoshioka et al. | | |

FOREIGN PATENT DOCUMENTS

| | | |
|---|---|---|
| JP | 2002-219319 A1 | 8/2002 |
| JP | 2005-052750 A | 3/2005 |
| JP | 2012-528074 A | 11/2012 |
| WO | 2006/030811 A1 | 3/2006 |
| WO | 2007/108428 A1 | 9/2007 |

OTHER PUBLICATIONS

Chinese Office Action, Chinese Application No. 202110086671.4, dated Apr. 29, 2022 (7 pages).
Chinese Office Action, Chinese Application No. 202110086671.4, dated Sep. 28, 2022 (7 pages).
Japanese Office Action (with English translation) dated Jun. 20, 2023 (Application No. 2020-034881).

* cited by examiner

HONEYCOMB FILTER

The present application is an application based on JP 2020-034881 filed on Mar. 2, 2020 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter which has high trapping performance and reduces pressure loss, and further exhibits high purification performance by being loaded with an exhaust gas purifying catalyst.

Description of the Related Art

Hitherto, as a filter adapted to trap particulate matter in exhaust gas emitted from an internal combustion engine, such as an automobile engine, or a device adapted to purify toxic gas components, such as CO, HC, and NOx, there has been known a honeycomb filter using a honeycomb structure (refer to Patent Documents 1 and 2). The honeycomb structure has a partition wall formed of porous ceramic, such as cordierite, and includes a plurality of cells defined by the partition wall. In the honeycomb filter, the foregoing honeycomb structure is provided with plugging portions that alternately plug the open ends on the inflow end face side and the open ends on the outflow end face side of the plurality of cells. In other words, the honeycomb filter has a structure in which inflow cells having the inflow end face side open and the outflow end face side plugged and outflow cells having the inflow end face side plugged and the outflow end face side open are arranged alternately with the partition wall therebetween. Further, in the honeycomb filter, the porous partition wall functions as a filter that traps the particulate matter in exhaust gas. Hereinafter, the particulate matter contained in exhaust gas may be referred to as "PM." The "PM" is an abbreviation of "particulate matter."

Exhaust gas is purified by a honeycomb filter as described below. First, the honeycomb filter is disposed such that the inflow end face side is positioned on the upstream side of an exhaust system through which exhaust gas is emitted. The exhaust gas flows into inflow cells from the inflow end face side of the honeycomb filter. Then, the exhaust gas that has flowed into the inflow cells passes through a porous partition wall, flows toward outflow cells, and is emitted from the outflow end face of the honeycomb filter. When passing through the porous partition wall, PM and the like in the exhaust gas are trapped and removed.

[Patent Document 1] JP-A-2002-219319
[Patent Document 2] International Publication No. 2006/030811

A honeycomb filter used to purify exhaust gas emitted from an automobile engine has been adopting, as a porous partition wall, a high-porosity porous body having high porosity. In recent years, there has been a demand for improvement in the filtration efficiency of honeycomb filters due to the tightening of automobile emission regulations and the like.

As a means for improving the filtration efficiency of a honeycomb filter, for example, a method of reducing the average pore diameter of a porous partition wall can be cited. However, the average pore diameter of the partition wall significantly influences the pressure loss of the honeycomb filter, and there has been a problem that the pressure loss of the honeycomb filter inconveniently increases when the average pore diameter of the partition wall is reduced. At this time, the pressure loss could be reduced by further increasing the porosity of the partition wall, but there has been a problem that further increasing the porosity of the partition wall inconveniently leads to lower mechanical strength of the honeycomb filter.

SUMMARY OF THE INVENTION

The present invention has been made in view of the problems with the prior arts described above. The present invention provides a honeycomb filter which has high trapping performance and reduces pressure loss, and further exhibits high purification performance by being loaded with an exhaust gas purifying catalyst.

According to the present invention, a honeycomb filter described below is provided.

According to a first aspect of the present invention, a honeycomb filter is provided including:

a pillar-shaped honeycomb structure body having a porous partition wall disposed so as to surround a plurality of cells which serve as fluid through channels extending from a first end face to a second end face; and a plugging portion provided at an open end on the first end face side or the second end face side of each of the cells, wherein the partition wall is composed of a material containing cordierite as a main component thereof, porosity of the partition wall measured by a mercury press-in method is 60 to 68%, an average pore diameter of the partition wall measured by a mercury press-in method is 8 to 12 μm, and in a pore diameter distribution which indicates a cumulative pore volume of the partition wall measured by a mercury press-in method, with a pore diameter (μm) on an abscissa axis and a log differential pore volume ($cm^3/g$) on an ordinate axis, a first peak that includes a maximum value of the log differential pore volume has a pore diameter value of 10 μm or less, the pore diameter value corresponding to a ⅓ value width of a maximum value of the log differential pore volume.

According to a second aspect of the present invention, the honeycomb filter described in the foregoing first aspect is provided, wherein a ratio of the volume of pores that have pore diameters exceeding 20 μm with respect to a total pore volume of the partition wall is below 20% in the pore diameter distribution.

According to a third aspect of the present invention, the honeycomb filter described in the foregoing first or second aspects is provided, wherein a ratio of the volume of pores that have pore diameters below 5 μm with respect to a total pore volume of the partition wall is below 15% in the pore diameter distribution.

According to a fourth aspect of the present invention, the honeycomb filter described in any one of the foregoing first to third aspects is provided, wherein a surface of the partition wall is loaded with an exhaust gas purifying catalyst.

The honeycomb filter in accordance with the present invention provides an effect of enabling high trapping performance and reduction of pressure loss. More specifically, the honeycomb filter in accordance with the present invention has an average pore diameter of the partition wall thereof set to 8 to 12 μm and the porosity of the partition wall thereof set to 60 to 68%, thereby making it possible to reduce pressure loss while maintaining mechanical strength. In addition, the honeycomb filter in accordance with the present invention is configured such that, in the pore diameter distribution of partition wall, the first peak that includes the maximum value of the log differential pore volume has a pore diameter value of 10 μm or less, the pore diameter value corresponding to the ⅓ value width of the maximum value of the log differential pore volume. Consequently, the pore diameter distribution of the partition wall has a sharp first peak, thus making it possible to reduce a large pore volume ratio attributable to pores having relatively large pore diameters. Further, the honeycomb filter in accordance with the present invention has the pore diameter distribution described above, and has the average pore diameter of the partition wall set to 8 to 12 μm, so that, when the porous partition wall is loaded with an exhaust gas purifying catalyst, the loaded catalyst is deposited on the surface of the partition wall in a layered manner. The loading of the catalyst is referred to as "On wall," which enables both improvement of trapping performance and reduction in pressure loss of the honeycomb filter loaded with the catalyst. Further, the honeycomb filter in accordance with the present invention can be expected to improve purification performance because a gas flow becomes uniform after the loading of the catalyst.

DESCRIPTION OF THE PREFERRED EMBODIMENTS

The following will describe embodiments of the present invention; however, the present invention is not limited to the following embodiments. Therefore, it should be understood that those created by adding changes, improvements or the like to the following embodiments, as appropriate, on the basis of the common knowledge of one skilled in the art without departing from the spirit of the present invention are also covered by the scope of the present invention.

(1) Honeycomb Filter

Figure 1:
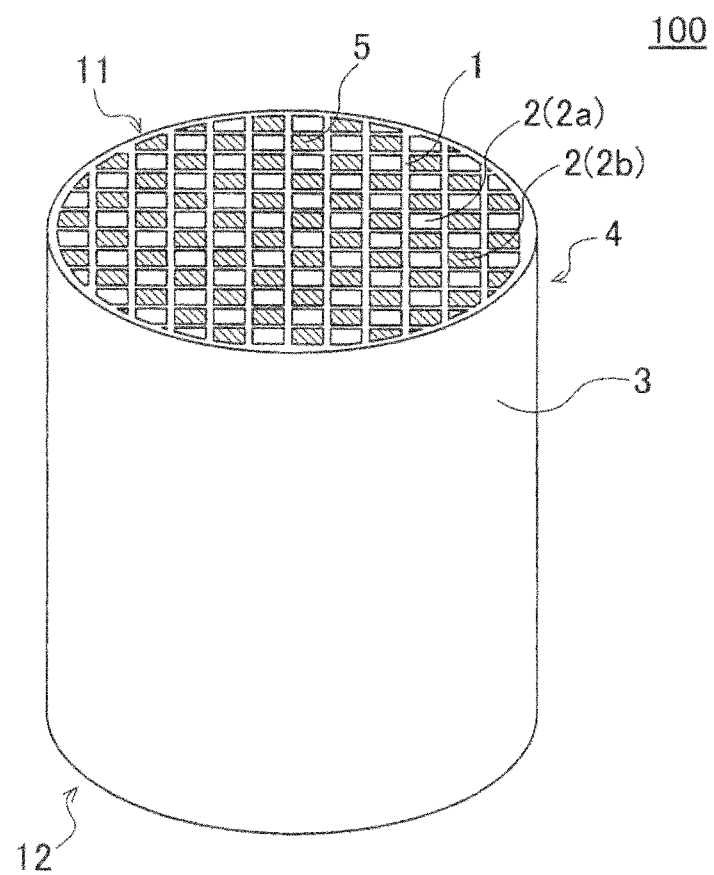
FIG. 1 is a perspective view schematically showing an embodiment of a honeycomb filter in accordance with the present invention viewed from an inflow end face side.
Figure 2:
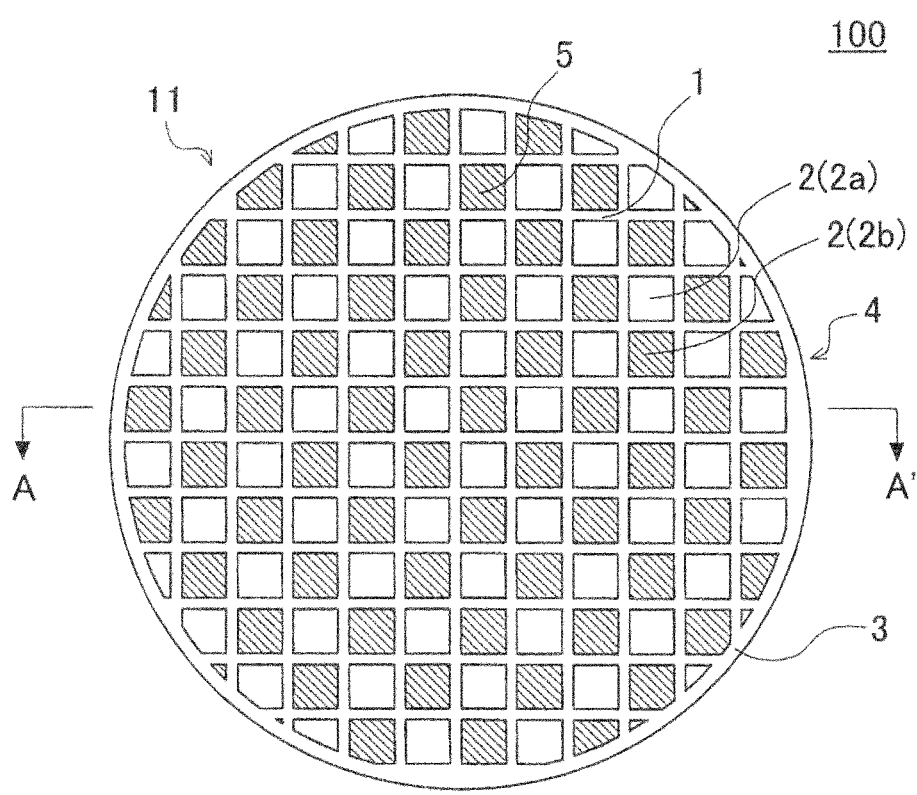
FIG. 2 is a plan view of the honeycomb filter shown in FIG. 1 viewed from the inflow end face side.
Figure 3:
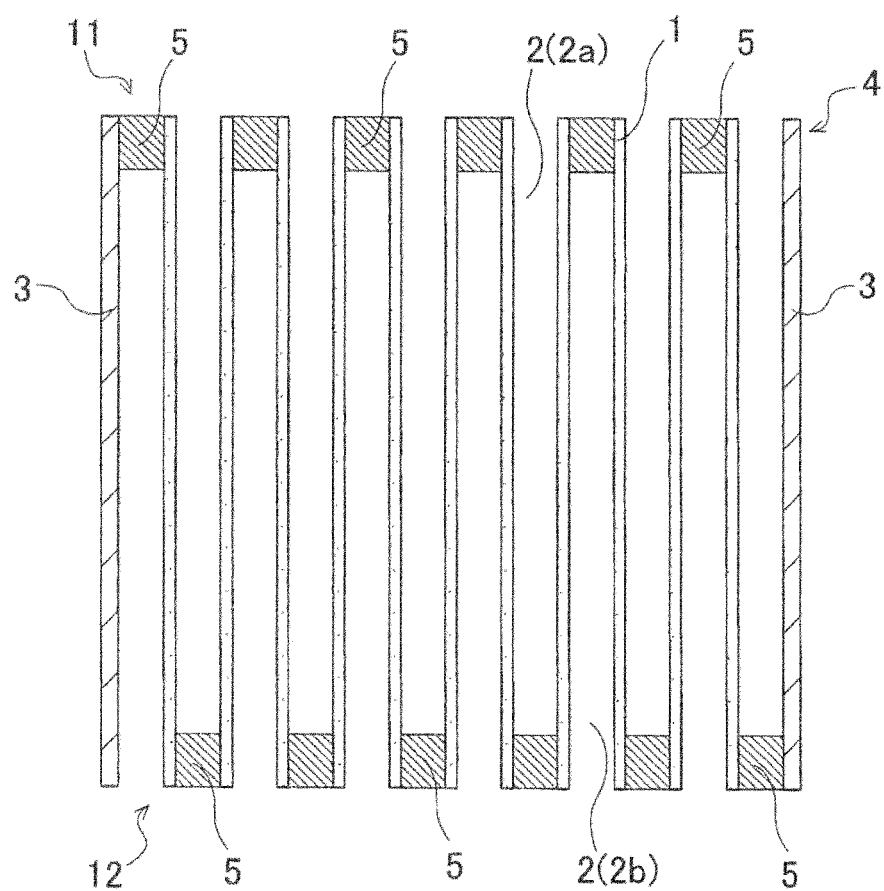
FIG. 3 is a sectional view schematically showing a section A-A' of FIG. 2.

As shown in FIG. 1 to FIG. 3, a first embodiment of the honeycomb filter in accordance with the present invention is a honeycomb filter 100 that includes a honeycomb structure body 4 and plugging portions 5. The honeycomb structure body 4 is a pillar-shaped structure having a porous partition wall 1 disposed so as to surround a plurality of cells 2 that serve as fluid through channels extending from a first end face 11 to a second end face 12. In the honeycomb filter 100, the honeycomb structure body 4 is pillar-shaped and further includes an outer circumferential wall 3 on the outer circumferential side face. In other words, the outer circumferential wall 3 is provided to encompass the partition wall 1 provided in a grid pattern. The plugging portions 5 are provided at open ends on the first end face 11 side or the second end face 12 side of each of the cells 2.

FIG. 1 is a perspective view schematically showing an embodiment of the honeycomb filter in accordance with the present invention viewed from an inflow end face side. FIG. 2 is a plan view of the honeycomb filter shown in FIG. 1, viewed from the inflow end face side. FIG. 3 is a sectional view schematically showing a section A-A' of FIG. 2.

In the honeycomb filter 100, the partition wall 1 constituting the honeycomb structure body 4 is configured as described below. First, the partition wall 1 is composed of a material that contains cordierite as the main component thereof. The partition wall 1 is preferably composed of cordierite except for components that are inevitably contained.

In the honeycomb filter 100, the porosity of the partition wall 1 is 60 to 68%. The values of the porosity of the partition wall 1 are obtained by measurement using a mercury press-in method. The porosity of the partition wall 1 can be measured using, for example, Autopore 9500 (trade name) manufactured by Micromeritics. To measure the porosity, a part of the partition wall 1 is cut out as a test piece from the honeycomb filter 100, and the test piece obtained in such a manner can be used for the measurement. For example, the porosity of the partition wall 1 is preferably 60 to 66% and more preferably 61 to 64%.

Setting the porosity of the partition wall 1 to 60 to 68% enables the pressure loss to be reduced. If the porosity of the partition wall 1 is below 60%, the effect of reducing the pressure loss of the honeycomb filter 100 cannot be fully obtained. On the other hand, if the porosity of the partition wall 1 exceeds 68%, then the mechanical strength of the honeycomb filter 100 inconveniently deteriorates.

In the honeycomb filter 100, the average pore diameter of the partition wall 1 is 8 to 12 μm. The value of the average pore diameter of the partition wall 1 is obtained by measurement using the mercury press-in method. The average pore diameter of the partition wall 1 can be measured using, for example, Autopore 9500 (trade name) manufactured by Micromeritics. The measurement of the average pore diameter can be performed using the foregoing test piece for measuring the porosity. The average pore diameter of the partition wall 1 is preferably 8 to 10 μm, for example.

Setting the average pore diameter of the partition wall 1 to 8 to 12 μm enables the trapping performance to be improved. If the average pore diameter of the partition wall 1 is below 8 μm, then the pressure loss of the honeycomb filter 100 inconveniently increases. On the other hand, if the average pore diameter of the partition wall 1 exceeds 12 μm, then an exhaust gas purifying catalyst easily penetrates into the partition wall 1 when the catalyst is loaded. This makes it difficult for the catalyst loading to be in the form of "On wall", and the effect of improving the filtration efficiency of the honeycomb filter 100 cannot be fully obtained.

Further, the honeycomb filter 100 has a first peak configured as described below in a pore diameter distribution, which shows the cumulative pore volume of the partition wall 1 measured by the mercury press-in method, with a pore diameter (μm) on the abscissa axis and a log differential pore volume (cm³/g) on the ordinate axis. Here, the first peak is a peak that includes a maximum value of the log differential pore volume in the pore diameter distribution. Regarding the first peak, the pore diameter value that corresponds to the ⅓ value width of the maximum value of the log differential pore volume of the first peak is 10 μm or less. Here, "the ⅓ value width" means the width of the first peak at the ⅓ value of the maximum value of the log differential pore volume of the first peak. The width of the first peak is determined on the basis of the value of the pore diameter (μm) shown on the abscissa axis. Hereinafter, "the value of a pore diameter corresponding to the ⅓ value width of the maximum value of the log differential pore volume of the first peak" may be referred to simply as "the ⅓ value width of the first peak."

If the ⅓ value width of the first peak is 10 μm or less, then the first peak will be sharp in the pore diameter distribution of the partition wall 1, thus making it possible to reduce a large pore volume ratio due to pores having relatively large pore diameters and a small pore volume ratio due to pores having relatively small pore diameters. Consequently, both improvement of trapping performance and reduction in pressure loss of the honeycomb filter 100 loaded with an exhaust gas purifying catalyst can be achieved. If the ⅓ value width of the first peak exceeds 10 μm, then the first peak becomes wide (broad), making it difficult to obtain the two effects described above. There is no particular restriction on the lower limit value of the ⅓ value width of the first peak, but the lower limit value is, for example, approximately 3 μm. Accordingly, the ⅓ value width of the first peak is preferably 3 to 10 μm, and more preferably 4 to 8 μm.

The cumulative pore volume of the partition wall 1 is indicated by a value measured by the mercury press-in method. The measurement of the cumulative pore volume of the partition wall 1 can be performed using, for example, Autopore 9500 (trade name) manufactured by Micromeritics. The measurement of the cumulative pore volume of the partition wall 1 can be performed by the following method. First, a part of the partition wall 1 is cut out from the honeycomb filter 100 to make a test piece for measuring the cumulative pore volume. There is no particular restriction on the size of the test piece, but the test piece is preferably, for example, a rectangular parallelepiped having a length, a width, and a height of approximately 10 mm, approximately 10 mm, and approximately 20 mm, respectively. There is no particular restriction on a portion of the partition wall 1 from which the test piece is cut out, but the test piece is preferably made by cutting out from the vicinity of the center of the honeycomb structure body in the axial direction. The obtained test piece is placed in a measurement cell of a measurement device, and the interior of the measurement cell is decompressed. Next, mercury is introduced into the measurement cell. Next, the mercury that has been introduced into the measurement cell is pressurized, and the volume of the mercury pushed into the pores existing in the test piece is measured during the pressurization. At this time, as the pressure applied to the mercury is increased, the mercury is pushed into the pores progressively from pores having larger pore diameters and then to pores having smaller pore diameters. Consequently, the relationship between "the pore diameters of the pores formed in the test piece" and "the cumulative pore volume" can be determined from the relationship between "the pressure applied to the mercury" and "the volume of the mercury pushed into the pores." The "cumulative pore volume" refers to, for example, a value obtained by accumulating the pore volumes from a maximum pore diameter to a particular pore diameter.

Figure 4:
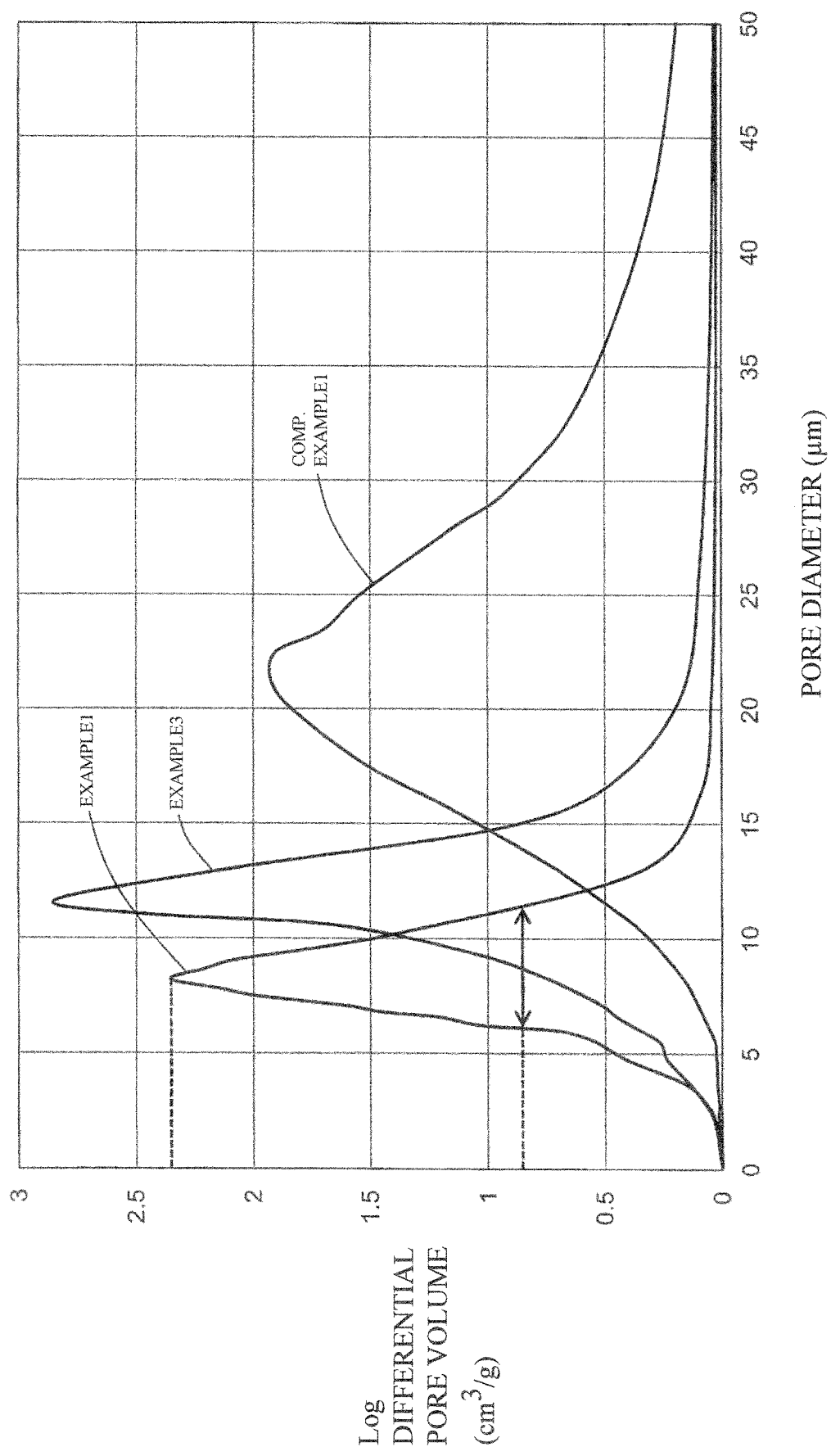
FIG. 4 is a graph showing the pore diameter distributions of the honeycomb filters of Examples 1 and 3 and Comparative Example 1.

The "pore diameter distribution of the partition wall 1, with the pore diameter on the abscissa axis and the log differential pore volume on the ordinate axis" can be shown by, for example, a graph having the pore diameter (unit: μm) indicated on the abscissa axis and the log differential pore volume (unit: cm$^3$/g) indicated on the ordinate axis. Such a graph may be, for example, the graph shown in FIG. 4. The graph of FIG. 4 shows the pore diameter distributions of the honeycomb filters of Examples 1 and 3, and Comparative Example 1 in the examples which will be discussed later. In FIG. 4, the honeycomb filters of Examples 1 and 3 correspond to the honeycomb filters of the present embodiment. The honeycomb filter of Comparative Example 1 is a conventional honeycomb filter to be compared.

The graph showing the pore diameter distributions as shown in FIG. 4 will be described in further detail. The graph shown in FIG. 4 is a graph indicating the relationship between "Pore diameter (μm)" and "Log differential pore volume (cm$^3$/g)." When the pressure is gradually applied to intrude the mercury into the pores of the sample in a container hermetically sealed to a vacuum state by the mercury press-in method, the mercury under the pressure progressively intrudes into larger pores and then into smaller pores of the sample. Based on the pressure and the amount of mercury intruded at that time, the pore diameters of the pores formed in the sample and the pore volumes can be calculated. Hereinafter, when the pore diameters are denoted by D1, D2, D3 . . . , a relationship of D1>D2>D3 . . . is to be satisfied. Here, an average pore diameter D between measurement points (e.g., from D1 to D2) can be indicated on the abscissa axis by "the average pore diameter D=(D1+D2)/2." Further, the Log differential pore volume on the ordinate axis can be indicated by a value obtained by dividing an increment dV of the pore volume between measurement points by a difference value treated as the logarithms of the pore diameters (i.e., "log (D1)−log (D2)." In a graph showing such a pore diameter distribution, a peak means a turning point indicated by the distribution, and a peak that includes the maximum value of the log differential pore volume is defined as the first peak.

In the pore diameter distribution of the partition wall 1, the ratio of the volume of pores having pore diameters exceeding 20 μm with respect to the total pore volume of the partition wall 1 is preferably below 20%. This configuration makes it possible to reduce a large pore volume ratio attributable to pores having relatively large pore diameters, thus enabling further improvement of the trapping performance. The ratio of the volume of pores having pore diameters exceeding 20 μm is further preferably below 10%.

In the pore diameter distribution of the partition wall 1, the ratio of the volume of pores having pore diameters below 5 μm with respect to the total pore volume of the partition wall 1 is preferably below 15%. This configuration makes it possible to reduce a small pore volume ratio attributable to pores having relatively small pore diameters, thus enabling a further reduction in pressure loss. The ratio of the volume of pores having pore diameters below 5 μm is further preferably below 10%. The ratio of the volume of pores having pore diameters exceeding 20 μm and the ratio of the volume of pores having pore diameters below 5 μm can be determined from the cumulative pore volume of the partition wall 1 or a graph showing pore diameter distributions as shown in FIG. 4.

There is no particular restriction on the thickness of the partition wall 1, but the thickness of the partition wall 1 is, for example, preferably 0.20 to 0.25 mm, more preferably 0.20 to 0.24 mm, and especially preferably 0.20 to 0.23 mm. The thickness of the partition wall 1 can be measured using, for example, a scanning electron microscope or a microscope. If the thickness of the partition wall 1 is too thin, it is undesirable in that the trapping performance deteriorates. On the other hand, if the thickness of the partition wall 1 is too thick, it is undesirable in that the pressure loss increases.

There is no particular restriction on the shapes of the cells 2 formed in the honeycomb structure body 4. For example, the shapes of the cells 2 in the section that is orthogonal to the extending direction of the cells 2 may be polygonal, circular, elliptical or the like. A polygonal shape may be triangular, quadrangular, pentagonal, hexagonal, octagonal or the like. The shapes of the cells 2 are preferably triangular, quadrangular, pentagonal, hexagonal or octagonal. Further, regarding the shapes of the cells 2, all the cells 2 may have the same shape or different shapes. For example, although not shown, quadrangular cells and octagonal cells may be mixed. Further, regarding the sizes of the cells 2, all the cells 2 may have the same size or different sizes. For example, although not shown, among the plurality of cells, some cells may be made large and the other cells may be made relatively smaller. In the present invention, "the cells 2" mean the spaces surrounded by the partition wall 1.

The cell density of the cells 2 defined by the partition wall 1 is preferably 30 to 50 cells/cm$^2$, and more preferably 35 to 50 cells/cm$^2$. This configuration enables the honeycomb filter 100 to be suitably used as a filter for purifying exhaust gas emitted from an automobile engine.

The circumferential wall 3 of the honeycomb structure body 4 may be configured integrally with the partition wall 1 or may be composed of a circumferential coat layer formed by applying a circumferential coating material to the circumferential side of the partition wall 1. For example, although not shown, the circumferential coat layer can be provided on the circumferential side of the partition wall after the partition wall and the circumferential wall are integrally formed and then the formed circumferential wall is removed by a publicly known method, such as grinding, in a manufacturing process.

There is no particular restriction on the shape of the honeycomb structure body 4. The honeycomb structure body 4 may be pillar-shaped, the shapes of the first end face 11 (e.g., the inflow end face) and the second end face 12 (e.g., the outflow end face) being circular, elliptical, polygonal or the like.

There is no particular restriction on the size of the honeycomb structure body 4, e.g. the length from the first end face 11 to the second end face 12, and the size of the section that is orthogonal to the extending direction of the cells 2 of the honeycomb structure body 4. Each size may be selected as appropriate such that optimum purification performance is obtained when the honeycomb filter 100 is used as a filter for purifying exhaust gas.

In the honeycomb filter 100, the plugging portions 5 are provided at the open ends on the first end face 11 side of predetermined cells 2 and at the open ends on the second end face 12 side of the remaining cells 2. If the first end face 11 is defined as the inflow end face, and the second end face 12 is defined as the outflow end face, then the cells 2 which have the plugging portions 5 placed at the open ends on the outflow end face side and which have the inflow end face side open are defined as inflow cells 2a. Further, the cells 2 which have the plugging portions 5 placed at the open ends on the inflow end face side and which have the outflow end face side open are defined as outflow cells 2b. The inflow cells 2a and the outflow cells 2b are preferably arranged alternately with the partition wall 1 therebetween. This, in addition, preferably forms a checkerboard pattern by the plugging portions 5 and "the open ends of the cells 2" on both end faces of the honeycomb filter 100.

The material of the plugging portions 5 is preferably a material that is preferred as the material of the partition wall 1. The material of the plugging portions 5 and the material of the partition wall 1 may be the same or different.

The honeycomb filter 100 preferably has the partition wall 1, which defines the plurality of cells 2, loaded with an exhaust gas purifying catalyst. Loading the partition wall 1 with a catalyst refers to coating the catalyst onto the surface of the partition wall 1 and the inner walls of the pores formed in the partition wall 1. This configuration makes it possible to turn CO, NOx, HC or the like in exhaust gas into harmless substances by catalytic reaction. In addition, the oxidation of PM of trapped soot or the like can be accelerated. In the honeycomb filter 100 of the present embodiment, the catalyst is particularly preferably loaded by "On wall". This configuration makes it possible to achieve both improvement of the trapping performance and reduction in pressure loss after the catalyst is loaded. Further, after the catalyst is loaded, a gas flow becomes uniform, so that improvement of purification performance can be expected.

There is no particular restriction on the catalyst with which the partition wall 1 is loaded. For example, such a catalyst can be a catalyst which contains a platinum group element and which contains an oxide of an element of at least one of aluminum, zirconium, and cerium. The loading amount of the catalyst is preferably 50 to 100 g/L, and more preferably 75 to 100 g/L. In the present specification, the loading amount of a catalyst (g/L) indicates the amount (g) of a catalyst loaded per unit volume (L) of the honeycomb filter.

(2) Manufacturing Method of the Honeycomb Filter

There is no particular restriction on the manufacturing method of the honeycomb filter of the present embodiment shown in FIG. 1 to FIG. 3, and the honeycomb filter can be manufactured by the method described below. First, a plastic kneaded material for manufacturing a honeycomb structure body is prepared. The kneaded material for manufacturing the honeycomb structure body can be prepared, for example, as described below. Talc, kaolin, alumina, aluminum hydroxide, silica, and the like are used as raw material powders, and these raw material powders can be blended to obtain a chemical composition that contains silica in the range of 42 to 56% by mass, alumina in the range of 30 to 45% by mass, and magnesia in the range of 12 to 16% by mass.

Next, the kneaded material obtained as described above is subjected to extrusion so as to manufacture a honeycomb formed body having a partition wall that defines a plurality of cells, and an outer wall provided to encompass the partition wall.

The obtained honeycomb formed body is dried by, for example, microwave and hot air, and the open ends of the cells are plugged using the same material as the material used for manufacturing the honeycomb formed body, thereby making plugging portions. The honeycomb formed body may be further dried after making the plugging portions.

Next, the honeycomb formed body with the plugging portions added thereto is fired to manufacture a honeycomb filter. The firing temperature and the firing atmosphere differ according to the raw materials. A person skilled in the art can select a firing temperature and a firing atmosphere best suited to the selected materials.

EXAMPLES

The following will describe in more detail the present invention by examples, but the present invention is not at all limited by the examples.

Example 1

For the cordierite forming raw material, talc, kaolin, alumina, aluminum hydroxide, and porous silica were prepared. Then, the cumulative particle size distribution of each raw material was measured using a laser diffraction/scattering type particle diameter distribution measurement device (trade name: LA-960) manufactured by HORIBA, Ltd. In Example 1, the raw materials were blended to prepare the cordierite forming raw materials such that the blending ratios (parts by mass) of the raw materials exhibited the values shown in Table 1. In Table 1, the horizontal row of "Particle size D50 (μm)" shows the particle diameter of 50% by volume (i.e., a median diameter) of each raw material.

Next, 3.0 parts by mass of a water absorbable polymer as an organic pore former, 6.0 parts by mass of a binder, 1 part by mass of a surfactant, and 77 parts by mass of water were added to 100 parts by mass of a cordierite forming raw material to prepare a kneaded material. As the water absorbable polymer, a water absorbable polymer, the particle diameter of 50% by volume of which was 10 μm, was used. As the binder, methylcellulose was used. As a dispersing agent, a potassium laurate soap was used. Table 2 shows the blending ratios (parts by mass) of the organic pore formers and other raw materials. In Table 2, the horizontal row of "Particle size D50 (μm)" shows the particle diameter of 50% by volume (i.e., the median diameter) of the organic pore formers. Further, the blending ratios (parts by mass) shown in Table 2 indicate the ratios with respect to 100 parts by mass of the cordierite forming raw material.

Next, the obtained kneaded material was extruded by an extruder to manufacture a honeycomb formed body. Subsequently, the obtained honeycomb formed body was dried by high frequency dielectric heating, and then further dried using a hot air dryer. The shape of the cells in the honeycomb formed body was quadrangular.

Next, the plugging portions were formed in the dried honeycomb formed body. First, the inflow end face of the honeycomb formed body was masked. Then, the end portion provided with the mask (the end portion on the inflow end face side) was immersed in plugging slurry, and the open ends of the cells without the mask (the outflow cells) were filled with the plugging slurry. Thus, the plugging portions were formed on the inflow end face side of the honeycomb formed body. Then, the same process was repeated on the outflow end face of the dried honeycomb famed body thereby to form the plugging portions also in the inflow cells.

Next, the honeycomb formed body in which the plugging portions had been formed was dried with a microwave dryer, and further dried completely with a hot air dryer, and then both end faces of the honeycomb formed body were cut and adjusted to a predetermined size. Subsequently, the dried honeycomb formed body was degreased and fired to manufacture the honeycomb filter of Example 1.

The honeycomb filter of Example 1 had an end face diameter of 118 mm and a length of 127 mm in the extending direction of the cells. Further, the thickness of the partition wall was 0.22 mm, and the cell density was 47 cells/cm$^2$. The values of the partition wall thickness and the cell density are shown in Table 3.

On the honeycomb filter of Example 1, the porosity and the average pore diameter of the partition wall were measured by the following method. The results are shown in Table 3. In addition, the cumulative pore volume of the partition wall was also measured, and based on the measurement result, the total pore volume of the pores formed in the partition wall was determined. Further, each of the ratios of the volume of pores below 5 the volume of pores of 5 to 20 and the volume of pores exceeding 20 μm with respect to the foregoing total pore volume was calculated. The results are shown in Table 3. Further, based on the cumulative pore volume of the partition wall, a pore diameter distribution indicating the pore diameter (μm) on the abscissa axis and the log differential pore volume (cm$^3$/g) on the ordinate axis was created, and the ⅓ value width (μm) of the first peak of the pore diameter distribution was determined. The results are shown in Table 3.

TABLE 1

| | Blending ratio of cordierite forming raw material (parts by mass) | | | | | | | | |
|---|---|---|---|---|---|---|---|---|---|
| | Talc | | Kaolin | Alumina | Aluminum hydroxide | | Fused silica | Porous silica | | |
| Particle size D50 (μm) | 10 | 20 | 5 | 5 | 6 | 1 | 3 | 25 | 13 | 14 | 20 |
| Example 1 | 40 | — | 19 | 14 | — | — | 15 | — | 12 | — | — |
| Example 2 | 40 | — | 19 | — | 14 | — | 15 | — | — | 12 | — |
| Example 3 | 40 | — | 19 | — | 14 | — | 15 | — | 12 | — | — |
| Comparative Example 1 | — | 40 | 16 | — | 10 | 22 | — | 12 | — | — | — |
| Comparative Example 2 | — | 40 | 19 | — | 14 | — | 15 | — | — | — | 12 |

TABLE 2

| | Blending ratio of organic pore former (parts by mass) | | | | Blending ratio of other raw materials (parts by mass) | | |
|---|---|---|---|---|---|---|---|
| Material | Foamable resin | Water absorbable polymer | | | Binder | Surfactant | Water |
| Particle size D50 (μm) | 45 | 10 | 25 | 30 | — | — | — |
| Example 1 | — | 3.0 | — | — | 6.0 | 1 | 77 |
| Example 2 | — | — | 3.0 | — | 6.0 | 1 | 77 |
| Example 3 | — | — | 3.0 | — | 6.0 | 1 | 77 |
| Comparative Example 1 | 9 | — | 0.5 | — | 6.0 | 1 | 26 |

TABLE 2-continued

| | Blending ratio of organic pore former (parts by mass) | | Blending ratio of other raw materials (parts by mass) | | |
|---|---|---|---|---|---|
| Material | Foamable resin | Water absorbable polymer | Binder | Surfactant | Water |
| Comparative Example 2 | — | — | 3.0 | 6.0 | 1 | 77 |

TABLE 3

| | Partition wall thickness (mm) | Cell density (cells/cm$^2$) | Porosity (%) | Average pore dia. (μm) | 1/3 value width of 1st peak (μm) | Pore volume ratio (%) with respect to total pore volume | | |
|---|---|---|---|---|---|---|---|---|
| | | | | | | Below 5 μm | 5~20 μm | Over 20 μm |
| Example 1 | 0.22 | 47 | 61 | 8 | 6 | 11.7 | 83.6 | 4.7 |
| Example 2 | 0.20 | 42 | 64 | 12 | 6 | 8.1 | 84.5 | 7.4 |
| Example 3 | 0.23 | 39 | 63 | 10 | 5 | 11.1 | 82.5 | 6.4 |
| Comparative Example 1 | 0.30 | 47 | 65 | 21 | 21 | 1.3 | 44.0 | 54.7 |
| Comparative Example 2 | 0.25 | 47 | 65 | 19 | 18 | 2.3 | 50.9 | 46.8 |

(Porosity)

The measurement of the porosity of the partition wall was performed using Autopore 9500 (trade name) manufactured by Micromeritics. In the measurement of the porosity, a part of the partition wall was cut out from the honeycomb filter to obtain a test piece, and the porosity was measured using the obtained test piece. The test piece was a rectangular parallelepiped having a length, a width, and a height of approximately 10 mm, approximately 10 mm, and approximately 20 mm, respectively. The sampling location of the test piece was set in the vicinity of the center of the honeycomb structure body in the axial direction.

(Average Pore Diameter)

The measurement of the average pore diameter of the partition wall was performed using Autopore 9500 (trade name) manufactured by Micromeritics. The test piece used for measuring the porosity was used also for measuring the average pore diameter. The average pore diameter of the partition wall is indicated by a value calculated by defining the average pore diameter as a pore diameter providing a volume that is half a total pore volume by the mercury press-in method.

(Cumulative Pore Volume)

The measurement of the cumulative pore volume of the partition wall was performed using Autopore 9500 (trade name) manufactured by Micromeritics. The test piece used for measuring the porosity was used also for measuring the cumulative pore volume.

On the honeycomb filter of Example 1, the filtration efficiency, the pressure loss, and the purification performance were evaluated by the following method. The results are shown in Table 4. The evaluation of each of the filtration efficiency, the pressure loss, and the purification performance was performed according to the following method by loading each honeycomb filter to be evaluated with a catalyst containing a platinum group element.

(Catalyst Loading Method)

First, a catalyst slurry containing aluminum oxide having an average particle diameter of 30 μm was prepared. Then, using the prepared catalyst slurry, the honeycomb filter was loaded with the catalyst. To be specific, the loading of the catalyst was performed by dipping the honeycomb filter, then excess catalyst slurry was blown away by air so as to load the partition wall of the honeycomb filter with a predetermined amount of the catalyst. Thereafter, the honeycomb filter loaded with the catalyst was dried at a temperature of 100° C. and was further subjected to heat treatment at 500° C. for two hours so as to obtain a honeycomb filter with the catalyst. The loading amount of catalyst with which the honeycomb filter of Example 1 was loaded was 100 g/L.

(Filtration Efficiency)

First, exhaust gas purification devices were fabricated by using the honeycomb filters with catalysts of the examples and the comparative examples as the exhaust gas purifying filters. Then, each of the fabricated exhaust gas purification devices was connected to an outlet side of an engine exhaust manifold of a 1.2 L direct injection type gasoline engine vehicle, and the number of soot particles contained in the gas emitted from the outlet port of the exhaust gas purification device was measured by a PN measurement method. As for the driving mode, a driving mode (RTS95) that simulates the worst of RDE driving was implemented. The total number of soot particles emitted after the driving in the mode was taken as the number of soot particles of the exhaust gas purification device to be determined, and the filtration efficiency (%) was calculated from the number of soot particles. The column of "Filtration efficiency ratio" of Table 4 shows the values of the filtration efficiency (%) of the exhaust gas purification device using the honeycomb filter with the catalyst of each of the examples and the comparative examples when the value of the filtration efficiency of the exhaust gas purification device using the honeycomb filter with the catalyst of Comparative Example 1 is defined as 100%. In the evaluation of the filtration efficiency, the honeycomb filter of each of the examples and the comparative examples was evaluated according to the following evaluation standard.

Evaluation "Excellent": If the value of the filtration efficiency ratio (%) exceeds 130%, then the evaluation is determined as "Excellent."

Evaluation "Good": If the value of the filtration efficiency ratio (%) is greater than 110% and equal to or less than 130%, then the evaluation is determined as "Good."

Evaluation "Acceptable": If the value of the filtration efficiency ratio (%) is greater than 100% and equal to or less than 110%, then the evaluation is determined as "Acceptable."

Evaluation "Fail": If the value of the filtration efficiency ratio (%) is equal to or less than 100%©, then the evaluation is determined as "Fail."

(Pressure Loss)

The exhaust gas emitted from a 1.2 L direct injection type gasoline engine was introduced at a flow rate of 600 m³/h at 700° C., and the pressures on the inflow end face side and the outflow end face side of each of the honeycomb filters with the catalysts were measured. Then, the pressure loss (kPa) of each of the honeycomb filters with the catalysts was determined by calculating the pressure difference between the inflow end face side and the outflow end face side. The column of "Pressure loss ratio" of Table 4 shows the value (%) of the pressure loss of the honeycomb filter with the catalyst of each of the examples and the comparative examples when the value of the pressure loss of the honeycomb filter with the catalyst of Comparative Example 1 is defined as 100%. In the evaluation of the pressure loss, the honeycomb filter of each example was evaluated according to the following evaluation standard.

Evaluation "Excellent": If the value of the pressure loss ratio (%) is equal to or less than 85%, then the evaluation is determined as "Excellent."

Evaluation "Good": If the value of the pressure loss ratio (%) is greater than 85% and equal to or less than 90%, then the evaluation is determined as "Good."

Evaluation "Acceptable": If the value of the pressure loss ratio (%) is greater than 90% and equal to or less than 100%, then the evaluation is determined as "Acceptable."

Evaluation "Fail": If the value of the pressure loss ratio (%) exceeds 100%, then the evaluation is determined as "Fail."

(Purification Performance)

First, exhaust gas purification devices that use the honeycomb filters with the catalysts of the examples and the comparative examples as the exhaust gas purifying filters were fabricated. Each of the fabricated exhaust gas purification devices was connected to an outlet side of an engine exhaust manifold of a 1.2 L direct injection type gasoline engine vehicle, and the concentration of NOx contained in the gas emitted through the outflow port of the exhaust gas purification device was measured to determine the NOx purification ratio. The column of "Purification performance ratio" of Table 4 shows the value of the NOx purification ratio (%) of each of the exhaust gas purification devices using the honeycomb filters with the catalysts of the examples and the comparative examples when the value of the NOx purification ratio of the exhaust gas purification device using the honeycomb filter with the catalyst of Comparative Example 1 is defined as 100%. In the evaluation of the purification performance, the honeycomb filter of each example and each comparative example was evaluated according to the following evaluation standard.

Evaluation "Excellent": If the value of the purification performance ratio (%) is equal to or greater than 107%, then the evaluation is determined as "Excellent."

Evaluation "Good": If the value of the purification performance ratio (%) is greater than 104% and below 107%, then the evaluation is determined as "Good."

Evaluation "Acceptable": If the value of the purification performance ratio (%) is greater than 100% and equal to or less than 104%, then the evaluation is determined as "Acceptable."

TABLE 4

|  | Evaluation of filtration efficiency | | Evaluation of pressure loss | | Evaluation of purification performance | |
| --- | --- | --- | --- | --- | --- | --- |
|  | Evaluation | Filtration efficiency ratio | Evaluation | Pressure loss ratio | Evaluation | Purification performance ratio |
| Example 1 | Excellent | 137% | Acceptable | 97% | Excellent | 108% |
| Example 2 | Good | 130% | Excellent | 84% | Good | 106% |
| Example 3 | Excellent | 136% | Good | 87% | Excellent | 107% |
| Comparative Example 1 | Reference | 100% | Reference | 100% | Reference | 100% |
| Comparative Example 2 | Acceptable | 103% | Fail | 103% | Acceptable | 103% |

Examples 2 and 3

In Examples 2 and 3, the blending ratios (parts by mass) of the raw materials used for the cordierite forming raw material were changed as shown in Table 1. In addition, the blending ratios (parts by mass) of the organic pore formers and other raw materials were also changed as shown in Table 2. Except that these raw materials were used to prepare the kneaded material, the honeycomb filters were manufactured by the same method as that of Example 1.

Comparative Examples 1 and 2

In Comparative Examples 1 and 2, the blending ratios (parts by mass) of the raw materials used for the cordierite forming raw material were changed as shown in Table 1. In addition, the blending ratios (parts by mass) of the organic pore formers and other raw materials were also changed as shown in Table 2. Except that these raw materials were used to prepare the kneaded material, the honeycomb filters were manufactured by the same method as that of Example 1. In Comparative Example 1, a foamable resin having a particle size D50 of 45 μm was used as a pore former in addition to the water absorbable polymer as an organic pore former. In Table 2, the column of "Organic pore former" shows the blending ratios (parts by mass) of the foamable resin as a pore former.

The porosity and the average pore diameter of the partition wall of each of the honeycomb filters of Examples 2 and 3 and Comparative Examples 1 and 2 were also measured by the same method as that of Example 1. Further, the cumulative pore volume of the partition wall was also measured, and based on the measurement result, the total pore volume of the pores formed in the partition wall was determined, and then the ratio of each of the volume of pores below 5 μm, the volume of pores of 5 to 20 μm, and the volume of pores exceeding 20 μm with respect to the total pore volume was calculated. In addition, based on the cumulative pore volume of the partition wall, a pore diameter distribution indicating the pore diameter (μm) on the abscissa axis and the log differential pore volume ($cm^3/g$) on the ordinate axis was created, and the ⅓ value width (μm) of the first peak of the pore diameter distribution was determined. The results are shown in Table 3. Among the graphs indicating the pore diameter distributions created as described above, the graphs indicating the pore diameter distributions of the honeycomb filters of Examples 1 and 3 and Comparative Example 1 are shown in FIG. 4.

The honeycomb filters of Examples 2, 3 and Comparative Examples 1, 2 were loaded with the catalysts by the same method as that of Example 1. On each of the honeycomb filters loaded with the catalysts (honeycomb filters with the catalysts), the filtration efficiency, the pressure loss, and the purification performance were evaluated by the same method as that of Example 1. The results are shown in Table 4.

(Results)

It was verified that the honeycomb filters of Examples 1 to 3 are superior to the honeycomb filter of Comparative Example 1, which provides the reference, in all evaluations of filtration efficiency, pressure loss, and purification performance. Consequently, it was found that the honeycomb filters of Examples 1 to 3 have excellent trapping performance, can suppress an increase in pressure loss, and further exhibit excellent purification performance, in comparison with the conventional honeycomb filter. On the other hand, the evaluation results of the honeycomb filter of Comparative Example 2 were inferior to those of the honeycomb filters of Examples 1 to 3 in terms of the filtration efficiency, the pressure loss, and the purification performance.

INDUSTRIAL APPLICABILITY

The honeycomb filter in accordance with the present invention can be used as a trapping filter for removing particulates and the like contained in exhaust gas.

DESCRIPTION OF REFERENCE NUMERALS

1: partition wall; 2: cell; 2a: inflow cell; 2b: outflow cell; 3: circumferential wall; 4: honeycomb structure body; 5: plugging portion; 11: first end face; 12: second end face; and 100: honeycomb filter.

What is claimed is:

1. A honeycomb filter comprising:
   a pillar-shaped honeycomb structure body having a porous partition wall disposed to surround a plurality of cells which serve as fluid through channels extending from a first end face to a second end face; and
   a plugging portion provided at an open end on the first end face side or the second end face side of each of the cells,
   wherein the partition wall is composed of a material containing cordierite as a main component thereof,
   porosity of the partition wall measured by a mercury press-in method is 60 to 68%,
   an average pore diameter of the partition wall measured by a mercury press-in method is 8 to 12 μm, and
   in a pore diameter distribution which indicates a cumulative pore volume of the partition wall measured by a mercury press-in method, with a pore diameter (μm) on an abscissa axis and a log differential pore volume ($cm^3/g$) on an ordinate axis, a first peak that includes a maximum value of the log differential pore volume has a pore diameter value of 10 μm or less, the pore diameter value corresponding to a ⅓ value width of a maximum value of the log differential pore volume.

2. The honeycomb filter according to claim 1,
   wherein a ratio of the volume of pores that have pore diameters exceeding 20 μm with respect to a total pore volume of the partition wall is below 20% in the pore diameter distribution.

3. The honeycomb filter according to claim 1,
   wherein a ratio of the volume of pores that have pore diameters below 5 μm with respect to a total pore volume of the partition wall is below 15% in the pore diameter distribution.

4. The honeycomb filter according to claim 1,
   wherein a surface of the partition wall is loaded with an exhaust gas purifying catalyst.

\* \* \* \* \*